United States Patent Office 3,427,302
Patented Feb. 11, 1969

3,427,302
α-TETRAZOLYLBENZYLPENICILLINS
John Michael Essery, Liverpool, N.Y., assignor to Bristol-Myers Company, New York, N.Y., a corporation of Delaware
No Drawing. Filed Sept. 11, 1967, Ser. No. 666,964
U.S. Cl. 260—239.1    10 Claims
Int. Cl. C07d 99/16; A61k 21/00

ABSTRACT OF THE DISCLOSURE

6 - (α-tetrazolylphenylacetamido)- and 6 - (α - tetrazolylthienylacetamido)-penicillanic acids are valuable as antibacterial agents, nutritional supplements in animal feeds, therapeutic agents in poultry and animals, including man, and are especially useful in the treatment of infectious diseases caused by Gram-positive and Gram-negative bacteria, most particularly those caused by the *Pseudomonas* genus. 6 - (α - tetrazolylphenylacetamido)-penicillanic acid, a preferred embodiment of the invention, is prepared by the treatment of 6-aminopenicillanic acid with p-nitrophenyl α-(5-tetrazolyl)-phenylacetate.

BACKGROUND OF THE INVENTION

Field of the invention

The penicillins of the present invention are compounds particularly useful in the treatment of Pseudomonas infections.

Description of the prior art

The compounds of the present invention are new and novel. Heretofore very few penicillins were found to possess any significant activity against Pseudomonas. The compounds of the present invention are unique in possessing this desirable activity.

SUMMARY OF THE INVENTION

The compounds of the invention are characterized as having the formula

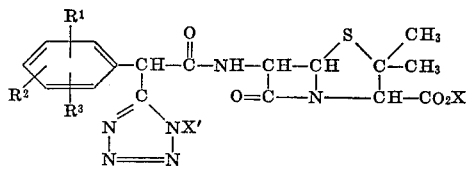

1A or

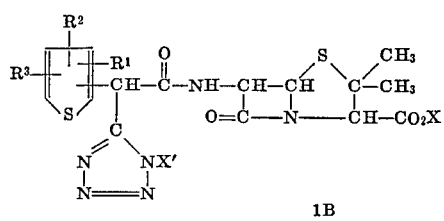

1B wherein $R^1$, $R^2$ and $R^3$ each represents a member selected from the group consisting of hydrogen, nitro, di(lower)-alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro and trifluoromethyl; X and X' are alike or different and each is hydrogen, nontoxic metallic cations such as sodium, potassium, calcium, aluminum, the ammonium cation or the like; or when X' is hydrogen, X is a substituted ammonium cation, e.g., cations of such nontoxic amines as tri(lower)alkylamines, i.e., triethylamine, etc., procaine, dibenzylamine, N-benzyl-β-phenethylamine, 1-ephenamine, N,N' - dibenzylethylenediamine, dehydroabietylamine, N,N' - bis-dehydroabietylethylenediamine, N-(lower)alkylpiperidine, e.g., N-ethylpiperidine, or other such amines which have been used to form pharmaceutically acceptable nontoxic salts with benzylpenicillin.

DETAILED DESCRIPTION

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and more particularly, relates to 6 - (α-tetrazolylphenylacetamido)-penicillanic acids, 6-(α - tetrazolylthienylacetamido)-penicillanic acids, and the pharmaceutically acceptable salts thereof.

Antibacterial agents such as ampicillin (U.S. 2,985,648) have proved highly effective in the past in the therapy of infections due to Gram-positive and Gram-negative bacteria but these compounds have been notably lacking in their ability to effectively control Pseudomonas infections.

It was an object of the present invention to provide compounds useful in the treatment of infections caused by Gram-positive and Gram-negative bacteria, including particularly those caused by *Pseudomonas aeruginosa*.

The compounds of the present invention are particularly useful in that they possess antibacterial activity against both Gram-positive and Gram-negative bacteria on parenteral administration, and most particularly exhibit activity against *Pseudomonas aeruginosa* infections.

The objects of the present invention have been achieved by the provision of a member selected from the group of compounds having the formula

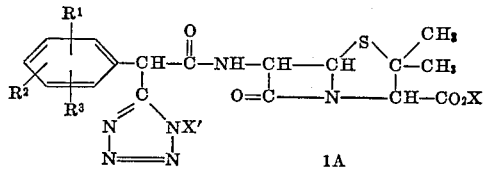

1A or

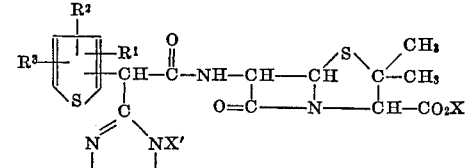

1B wherein $R^1$, $R^2$ and $R^3$ each represents a member selected from the group consisting of hydrogen, nitro, di(lower)-alkylamino, (lower)alkanoylamino, (lower)alkanoyloxy, (lower)alkyl (including straight and branched chain saturated aliphatic groups having from 1 to 6 carbon atoms inclusive and preferably methyl, ethyl, n-propyl), (lower)alkoxy (preferably methoxy and ethoxy), sulfamyl, chloro, iodo, bromo, fluoro and trifluoromethyl; X and X' are alike or different and each is hydrogen, nontoxic metallic cations such as sodium, potassium, calcium, aluminum, the ammonium cation, or the like; or when X' is hydrogen, X is a substituted ammonium cation, e.g., cations of such nontoxic amines as tri(lower)alkylamines, i.e., triethylamine, etc., procaine, dibenzylamine, N-benzyl - β - phenethylamine, 1 - ephenamine, N,N'-dibenzylethylenediamine, dehydroabietylamine, N,N'-bis-dehydroabietylethylenediamine, N - (lower)alkylpiperidine, e.g., N-ethylpiperidine, or other such amines which have been used to form pharmaceutically acceptable non-toxic salts with benzylpenicillin.

The α-carbon atom of the acyl group (to which the α-tetrazoylyl group is attached) is an asymmetric carbon atom and the compounds of this invention can therefore exist in two optically active isomeric forms [the D and L diasteroisomers], as well as in the form which is a mixture of the two optically active forms; all such isomeric forms of the compounds are included within the scope of the present invention. Also included within the scope of the present invention are easily hydrolyzed esters which are converted to the free acid form by chemical or enzymatic hydrolysis.

The compounds of the present invention are prepared by the process comprising the consecutive steps of:

(a) Mixing a compound having the formula

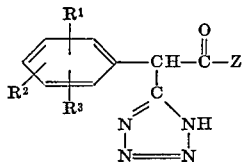

or

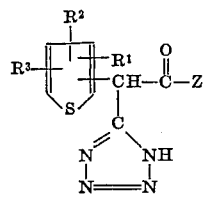

wherein Z is chloro, bromo, iodo, or a radical of the formula

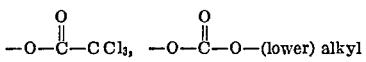

or

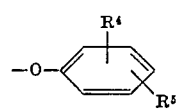

in which $R^4$ and $R^5$ are selected from the group consisting of hydrogen, nitro, $SO_3H$, CN or (lower)alkyl; but preferably

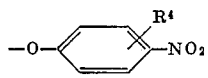

or a "functional equivalent" of the acylating agent; with 6-aminopenicillanic acid, preferably in a ratio of about 1.0 to 2.0 equivalents of the acylating agent per equivalent of the 6-aminopenicillanic acid, in the presence of a base, preferably an organic base such as a pyrrlidine, N-methylpiperidine, tri(lower)alkylamine, or the like, but preferably in the presence of pyridine or triethylamine, preferably in the ratio of about one to three moles of amine per mole of 6-aminopenicillanic acid, in an inert solvent such as dimethylformamide, dimethylsulfoxide, chloroform, tetrahydrofuran, methylene chloride, but preferably methylene chloride, at a temperature in the range of about −20° C. to 50° C., but preferably about 0° C. to 20° C., for a period of time of about thirty minutes to about five hours, but preferably about one to three hours, with rapid agitation to produce a compound having the formula

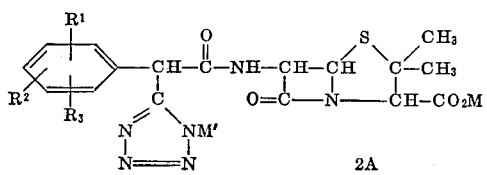

or

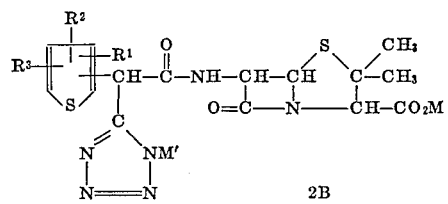

wherein $R^1$, $R^2$ and $R^3$ are as defined above, M and M' are alike or different and each is hydrogen or a cation corresponding to the base used above; and (b) Treating the above compound with a pharmaceutically acceptable base, in a ratio of about one to three moles of base per mole of compound, the base being characterized as a "readily available" source of pharmaceutically acceptable nontoxic cations, or as being capable of forming pharmaceutically acceptable ammonium or substituted ammonium cations to produce compounds having the formulas

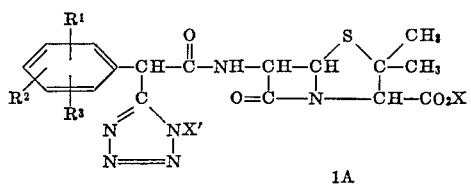

or

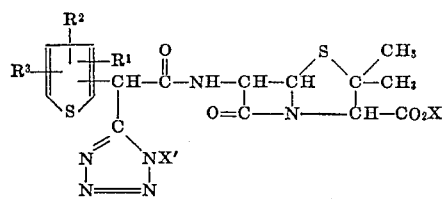

wherein $R^1$, $R^2$ and $R^3$ are as defined above, X and X' are alike or different and each is hydrogen or a pharmaceutically acceptable nontoxic cation, but preferably X and X' are alike or when X' is hydrogen, X is a pharmaceutically acceptable cation.

Functional equivalents include the corresponding acid halides, anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with 6-aminopenicillanic acid after first reacting said free acid with N,N'-dimethylchloroformiminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2684] of a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc. 80, 4065 (1958)] or an isoxazolium salt reagent [cf. R. B. Woodward, R. A. Olofson and H. Mayer, J. Amer. Chem. Soc. 83, 1010 (1961)]. Another equivalent is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. The by-product, imidazole, precipitates and may be separated and the imidazolide isolated, but this is not essential. The methods for carrying out these reactions to produce a penicillin and the methods used to isolate the penicillin so produced are wellknown in the art.

"Readily available" source of pharmaceutically acceptable nontoxic cation such as soduim, potassium, calcium, aluminum, or the like, is defined for the purpose of the present invention to mean: a metal hydroxide, i.e., sodium hydroxide, calcium hydroxide, ammonium hydroxide, or the like; a weak acid salt of a strong base, i.e., sodium or potassium 2-ethylhexanoate, or the like; a pharmaceutically acceptable nontoxic amine capable of forming a substituted ammonium cation, i.e., a tri(lower)alkylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N-(lower)alkylpiperidine, or other such amines which have been used to form pharmaceutically acceptable nontoxic salts with benzylpenicillins.

The compounds of the present invention are characterized by two acidic functional groups; the tetrazolyl and carboxylic acid moieties. While the tetrazolyl moiety is a characteristic of a weak acid and is only capable of forming salts of strong bases, the carboxylic acid moiety is capable of forming salts with most bases.

Because of the difference in the relative degree of acidity of these two acid functions, it is possible to prepare either a monosalt (carboxylate) or a disalt (carboxylate-tetrazolate) of the parent compounds.

The mono and disalts of the present invention can be prepared by stochiometric titration under anhydrous conditions in an anhydrous solvent by the use of one or two moles respectively of an anhydrous base such as sodium or potassium 2-ethyl-hexanoate in 1-butanol, or the like, or an organic base, such as a trialkylamine, dibenzylamine, and the others heretofore mentioned.

The mono salts (carboxylates) are stable salts and remain as such in aqueous media at a pH as low as 4. The disalts (carboxylate-tetrazolate) are stable and remain as such in aqueous media at a pH as low as about 7. Dropping the pH of a solution of a disalt to below about 6 but above 4 produces the monosalt.

In the treatment of bacterial infections in man, the compounds of this invention are administered topically, orally and parenterally, but preferably parenterally, in accordance with conventional procedures for antibiotic administration in an amount of from about 5 to 125 mg./kg./day and preferably in the range of 35 to 85 mg./kg./day for Pseudomonas infections in divided dosages, e.g., three or four times a day. They are administered in dosage units containing, for example, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

The following examples will serve to illustrate this invention without limiting it thereto.

DESCRIPTION OF THE PREFERRED EMBODIMENTS

Example 1.—α-(5-tetrazolyl)-phenylacetic acid

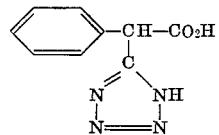

A solution of 32.0 g. (0.2 mole) of 5-benzyltetrazole in 400 ml. of tetrahydrofuran was added with stirring to a cold (—50° to —60°) solution of 0.4 mole of n-butyllithium in hexane (240 ml.) under a nitrogen atmosphere. The resulting bright yellow slurry was stirred for 15 minutes. Carbon dioxide was passed through the slurry until all of the color had disappeared. The mixture was then added to 600 ml. of water containing ammonium chloride and the 2-phase system was cooled in an ice-bath while 42% phosphoric acid was added with stirring to pH 3. The layers were separated and the aqueous phase was extracted twice with 200 ml. portions of ethyl acetate. The combined organic phases were washed with cold water, dried over magnesium sulfate and evaporated to low volume when 14.7 g. of the acid (M.P. 102–103° dec.) crystallized. Recrystallization was effected by dissolving the acid in tetrahydrofuran at room temperature, then diluting with ether and cooling to 5°. This gave the monohydrate, M.P. 106–107° dec.

Analysis.—Calc'd for $C_9H_8N_4O_2 \cdot H_2O$: C, 48.65; H, 4.54; N, 25.22; $H_2O$, 8.1. Found: C, 49.10; H, 4.70; N, 24.48; $H_2O$, 8.0.

Example 2.—p-Nitrophenyl α-(5-tetrazolyl)-phenylacetate p-Nitrophenyl trifluoroacetate (4.70 g., 0.02 mole) was added to a stirred solution of 2.22 g. (0.01 mole) of α-(5-tetrazolyl)-phenylacetic acid monohydrate in 20 ml. of dry pyridine. The clear yellow solution was stirred for 3 hours at room temperature. Most of the pyridine was then removed under reduced pressure and the residue was added to a mixture of ice-water and chloroform with stirring. The layers were separated and the aqueous phase was extracted three times with fresh chloroform. The extracts were combined, thoroughly washed with water, dried over magnesium sulfate and evaporated to a gum. Repeated trituration with toluene and then with ether gave a solid of M.P. 139–141°. Recrystallization from ethanol gave 1.5 g. of white crystals of M.P. 153.5–155°.

Analysis.—Calc'd for $C_{15}H_{11}N_5O_4 \cdot \tfrac{1}{2}H_2O$: C, 53.93; H, 3.62; N, 20.96. Found: C, 54.29; H, 3.82; N, 21.07, 20.73.

Example 3.—Dipotassium 6-[α-(5-tetrazolyl)-phenylacetamido]-penicillanate

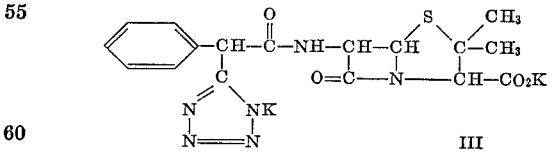

III p-Nitrophenyl α-(5-tetrazolyl)-phenylacetate (2.439 g., 0.0075 mole) was added with stirring to a cooled (—5° C. to +5° C.) solution of 1.62 g. (0.0075 mole) of 6-aminopenicillanic acid and 1.515 g. (0.015 mole) of triethylamine in 25 ml. of methylene chloride. The mixture was stirred for 2 hours; the cooling bath was then removed and stirring was continued for 17 hours at room temperature. It was then added to ice-water with stirring and the layers were separated. The aqueous phase, after having been extracted twice with chloroform, was acidified to pH 4.5 and was extracted with ethyl acetate to remove p-nitrophenol. The aqueous phase was acidified to pH 2 with 42% phosphoric acid and the product was extracted into ethyl acetate. The extracts were washed with .015 mole of a 50% solution of potassium 2-ethyl-hexanoate in n-butanol. Upon evaporation of the solvent to about half volume, a yellow solid separated on the walls of the flask. It was removed by trituration with ether and the product was collected by filtration and dried over phosphorus pentoxide in vacuo. This gave 2.5 g. of the dipotassium salt, the infrared and Nuclear Magnetic Resonance (N.M.R.) spectra of which were consistent with the structure.

*Analysis.*—Calc'd for $C_{17}H_{16}N_6O_4SK_2 \cdot 2H_2O$: C, 39.67; H, 3.92; N, 16.33; $H_2O$, 6.99. Found: C, 40.93; H, 4.23; N, 15.23; $H_2O$, 6.5.

The dl racemic mixture of dipotassium 6-[α-(5-tetrazolyl)-phenylacetamido]-penicillanate was compared to-ampicillin in its activity against various strains of *Pseudomonas aeruginosa* and other organisms:

|  | MIC (μg./ml.) | |
|---|---|---|
|  | III | Ampicillin |
| *Pseudomonas aeruginosa:* | | |
| 1 | 125 | >1,000 |
| 2 | 125 | 500 |
| 3 | 250 | 1,000 |
| 4 | 125 | >1,000 |
| *Proteus mirabilis:* | | |
| 1 | 16 | 63 |
| 2 | ≦2 | ≦2 |
| *Proteus vulgaris:* | | |
| 1 | 125 | 500 |
| *Proteus morganii:* | | |
| 1 | 500 | >1,000 |
| 2 | 8 | 125 |
| 3 | 25 | >100 |
| 4 | 32 | 125 |

The above table shows the MIC's of ampicillin range from about 3 to 10 times that of compound III.

Example 4

(A) Ethyl α-cyano-α-(3-thienyl) acetate.—To a suspension of 4.30 g. (0.1 mole) of 55.8% sodium hydride dispersion was added dropwise a mixture of 12.3 g. (0.1 mole) of 3-cyanomethylthiophene [prepared according to the procedure of E. Campaigne and W. C. McCarthy, J. Am. Chem. Soc. 76, 4466 (1954)] and 59.1 g. (0.5 mole) of diethyl carbonate. The reaction mixture was heated and at 40° a vigorous reaction occurred; heating was continued at 100° for 2 hours. The cooled solution was diluted with 70 ml. of ice-water and the aqueous phase was separated and acidified to pH 3. Extraction with ether followed by washing, drying and evaporation of the solvent provided an oil which on distillation gave 10.4 g. (54%) of product, B.P. 107–109°/.95 mm.

(B) Ethyl α-(5-tetrazolyl)-α-(3-thienyl) acetate.—A mixture of 28.7 g. (.147 mole) of ethyl α-cyano-α-(3-thienyl acetate, 14.3 g. (.22 mole) of sodium azide, 13.3 g. (.22 mole) of glacial acetic acid and 70 ml. of absolute ethanol was heated under reflux with stirring for 45 hours. The ethanol was removed under reduced pressure and the residue was dissolved in 150 ml. of water. After adjustment of the pH to 7, the aqueous solution was extracted with ethyl acetate (3×50 ml.). The aqueous phase was acidified to pH 3 and a brown oil separated. This oil was extracted into ethyl acetate and the aqueous phase was extracted with fresh solvent. The combined extracts were washed with water, dried (MgSO₄) and evaporated to a low volume. On cooling the solution, tan crystals of M.P. 94–95° were deposited. An analytical specimen (from ethyl acetate) had M.P. 96–97°.

*Analysis.*—Calc'd for $C_9H_{10}N_4O_2S$: C, 45.38; H, 4.23; N, 23.52; Found: C, 45.61; H, 4.44; N, 24.21, 24.10.

(C) α-(5-tetrazolyl)-α-(3-thienyl) acetic acid.—A solution containing 4.30 g. (.018 mole) of ethyl α-(5-tetrazolyl)-α-(3-thienyl) acetate and 1.44 g. (.036 mole) of sodium hydroxide in 40 ml. of water was heated for 3 hours on a steam-bath. The mixture was cooled and stirred while 42% phosphoric acid was added dropwise to pH 3. The white solid which precipitated was collected by filtration, washed with cold water and dried in vacuo over phosphorus pentoxide to give 3.22 g. of product of M.P. 110–111° decomp. A second crop of 0.5 g. was recrystallized from aqueous acetone to give a sample of M.P. 105–106° decomp.

*Analysis.*—Calc'd for $C_7H_6N_4O_2S \cdot H_2O$: C, 36.85; H, 3.53; N, 24.56. Found: C, 36.94; H, 3.84; N, 24.46.

Example 5.—p-Nitrophenyl α-(5-tetrazolyl)-α-(3-thienyl)-acetate

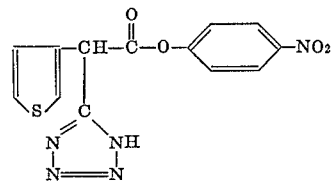

To a solution of 3.15 g. (.015 mole) of α-(5-tetrazolyl)-α-(3-thienyl) acetic acid in 30 ml. of dry pyridine was added 7.05 g. (.03 mole) of p-nitrophenyl trifluoroacetate. A slightly exothermic reaction occurred and the clear red solution was stirred at room temperature for 2.5 hours. The solution was evaporated to half volume under reduced pressure and the residue was added to 50 ml. of ice-water. This solution was extracted with 3×60 ml. portions of chloroform. The combined extracts were washed with water to remove p-nitrophenol and then dried and evaporated to a thick oil. Repeated trituration with dry ether caused the oil to solidify and 0.55 g. of solid M.P. 143–145° was collected by filtration. Slow evaporation of the solvent from the filtrate gave 1.2 g. of product, M.P. 157–159°. An analytical sample, by recrystallization from ethanol had M.P. 167–168°.

*Analysis.*—Calc'd for $C_{13}H_9N_5O_4S$: C, 47.14; H, 2.74. Found: C, 46.99; H, 3.33.

Example 6.—Disodium 6-[α-(5-tetrazolyl)-α-(3-thienyl)-acetamido]-penicillanate (IV)

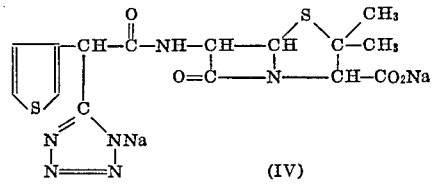

To a cold (0–5°) solution of 1.08 g. (5 mmole) of 6-aminopenicillanic acid and 1.01 g. (10 mmole) of triethylamine in 20 ml. of dry methylene chloride was added with stirring 1.655 g. (5 mmole of p-nitrophenyl α-(5-tetrazolyl)-α-(3-thienyl) acetate. The reaction mixture was stirred for 2 hours at 0–5° and then for 17 hours at room temperature. An excess of dry ether was added and an oil separated. This was converted to a stiff gum by repeated trituration with ether. The gum was dissolved in methanol and treated with 3.2 g. (10 mmole) of a 50% solution of sodium 2-ethylhexanoate in ether followed by the addition of an excess of dry ether. The solid which precipitated was collected by filtration, washed with ether and dried in vacuo over phosphorus pentoxide. It was then slurried with acetone for 1 hour, collected, washed with ether and re-dried to provide 1.52 g. of penicillin which was characterized by its infrared and nuclear magnetic resonance structure (N.M.R.).

The dl racemic mixture of disodium 6-[α-(5-tetrazolyl)-α-(3-thienyl)-acetamido]-penicillanate was compared to ampicillin in its activity against various strains of Pseudomonas and Proteus:

| Proteus | MIC (μg./ml.) | |
|---|---|---|
|  | IV | Ampicillin |
| *Proteus morganii* | 125 | 250 |
| *Pseudomonas aerugenosa* | 250 | 500 |

Example 7.—α-(5-tetrazolyl)-α-(2-thienyl)-acetic acid

Substitution in the procedures of Example 4 for the 3-substituted thiophenes used therein of 2-substituted thiophenes produces α-(5-tetrazolyl)-α-(2-thienyl) acetic acid.

Example 8.—p-Nitrophenyl α-(5-tetrazolyl)-α-(2-thienyl) acetate

Substitution in the procedure of Example 5 for the α-(5-tetrazolyl)-α-(3-theiyl) acetic acid used therein of α-(5-tetrazolyl)-α-(2-thienyl) acetic acid produces p-nitrophenyl α-(5-tetrazolyl)-α-(2-thienyl)-acetate.

Example 9.—Dipotassium 6-[α-(5-tetrazolyl)-α-(2-thienyl)-acetamido]-pencillanate

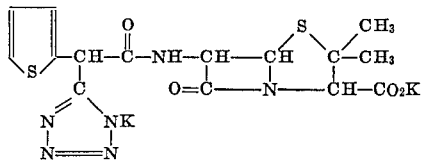

Substitution in the procedure of Example 6 for the p-nitrophenyl α-(5-tetrazolyl)-α-(3-thienyl)-acetate used therein of p-nitrophenyl) α - (5 - tetrazolyl) - α - (2-thiacetate produces dipotassium 6-[α-(5-tetrazolyl-α-(2-thienyl)-acetamido]-pencillanate.

Example 10.—2,4-dinitrophenyl α-(5-tetrazolyl)-phenyl-acetate

Substitution in the procedure of Example 2 for the p-nitrophenyl trifluoroacetate used therein of 2,4-dinitrophenyl trifluoroacetate produces 2,4-dinitrophenyl-α-(5-tetrazolyl)-phenylacetate.

Example 11.—Dipotassium 6-[α-(5-tetrazolyl)-phenyl-acetamido]-penicillanate

Substitution in the procedure of Example 3 for the p-nitrophenyl α-(5-tetrazolyl)-phenylacetate used therein of 2,4-dinitrophenyl α-(5-tetrazolyl)-phenylacetate produces dipotassium 6-[α-(5-tetrazolyl)-phenylacetamido]-penicillanate that was identical to that prepared in Example 3.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. The compounds having the formula

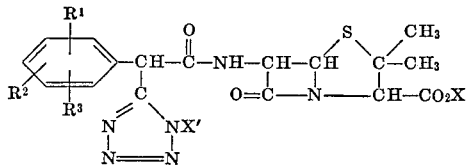

or

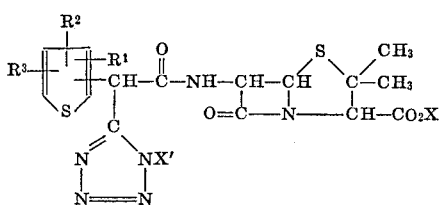

wherein $R^1$, $R^2$, and $R^3$ each represents a member selected from the group consisting of hydrogen, nitro, di(lower)-alkylamino, (lower)alkanoylamino, (lower)alkanoyloxy, (lower)alkyl, (lower)alkoxy, sulfamyl, chloro, iodo, bromo, fluoro and trifluoromethyl, X and X′ are alike or different and each represents hydrogen or a pharmaceutically acceptable nontoxic cation.

2. A compound of claim 1 having the formula

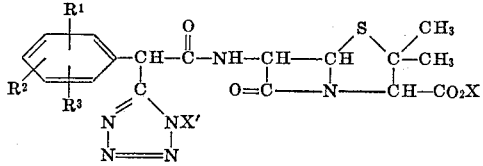

wherein $R^1$, $R^2$, and $R^3$ each represents a member selected from the group consisting of hydrogen, nitro, di(lower)-alkylamino, (lower)alkanoylamino, (lower)alkanoyloxy, (lower)alkyl, (lower)alkoxy, sulfamyl, chloro, iodo, bromo, fluoro and trifluoromethyl, X and X′ are alike and each represents a pharmaceutically acceptable nontoxic cation.

3. A compound of claim 1 having the formula

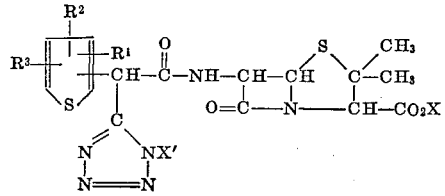

wherein $R^1$, $R^2$ and $R^3$ each represents a member selected from the group consisting of hydrogen, nitro, di(lower)alkylamino, (lower)alkanoylamino, (lower)alkanoyloxy, (lower)alkyl, (lower)alkoxyl, sulfamyl, chloro, iodo, bromo, fluoro and trifluoromethyl, X and X′ are alike and each represents a pharmaceutically acceptable nontoxic cation.

4. A compound of claim 1 having the formula

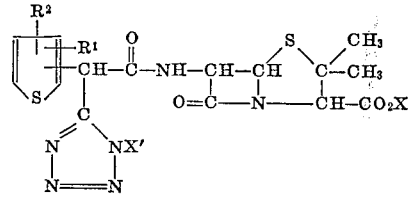

wherein $R^1$ and $R^2$ each represents a member selected from the group consisting of hydrogen, di(lower)alkylamino, (lower)alkyl, (lower)alkoxy, sulfamyl, chloro, fluoro and trifluoromethyl, X and X′ are alike and each represents a pharmaceutically acceptable nontoxic cation.

5. A compound of claim 1 having the formula

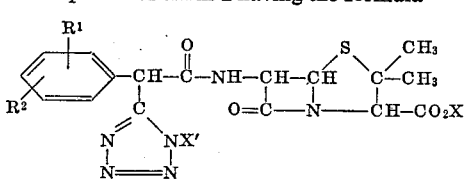

wherein $R^1$ and $R^2$ each represents a member selected from the group consisting of hydrogen, di-(lower)alkylamino, (lower)alkyl, (lower)alkoxy, sulfamyl, chloro, fluoro and trifluoromethyl, X and X′ are alike and each represents a pharmaceutically acceptable nontoxic cation.

6. A compound of claim 1 having the formula

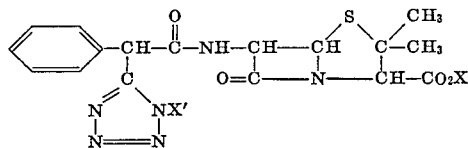

wherein X and X' are pharmaceutically acceptable non-toxic cations.

7. A compound of claim 1 having the formula

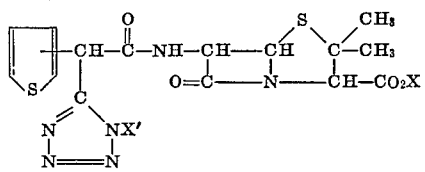

wherein X and X' are pharmaceutically acceptable non-toxic cations.

8. A compound of claim 1 known as 6-(α-tetrazolyl-phenylacetamido)-penicillanic acid, and the disodium and dipotassium salts thereof.

9. A compound of claim 1 known as 6-[D-α-tetrazolyl-α-(3-thienyl)-acetamido]-penicillanic acid, and the disodium and dipotassium salts thereof.

10. A compound of claim 1 known as 6-[D-α-tetrazolyl-α-(2-thienyl)-acetamido]-penicillanic acid and the disodium and dipotassium salts thereof.

References Cited

UNITED STATES PATENTS 3,284,446  11/1966  Lemieux et al. _____ 260—239.1

NICHOLAS S. RIZZO, *Primary Examiner.*

U.S. Cl. X.R.

260—308, 999